United States Patent [19]
Istorik et al.

[11] Patent Number: 5,451,138
[45] Date of Patent: Sep. 19, 1995

[54] UNIDIRECIONAL REACTION TURBINE OPERABLE UNDER REVERSIBLE FLUID FROM FLOW

[75] Inventors: Boris L. Istorik; Iouli B. Chpolianski, both of Moscow, Russian Federation; Alexander M. Gorlov, Brookline, Mass.

[73] Assignee: Northeastern University, Boston, Mass.

[21] Appl. No.: 179,965

[22] Filed: Jan. 11, 1994

[51] Int. Cl.$^6$ .......................... F03B 3/00; F03D 3/00
[52] U.S. Cl. .............................. 415/53.10; 415/182.1; 416/178; 416/187
[58] Field of Search ..................... 415/53.1, 53.2, 53.3, 415/182.1, 909; 416/178, 187; 60/497

[56] References Cited

U.S. PATENT DOCUMENTS

| | | |
|---|---|---|
| 135,459 | 2/1873 | Yarrell . |
| 1,396,609 | 11/1921 | Weisenborn . |
| 1,835,018 | 12/1931 | Darrieus .............. 416/111 |
| 2,098,876 | 11/1937 | Nash . |
| 3,033,441 | 5/1962 | Coester .............. 415/53.1 |
| 4,012,163 | 3/1977 | Baumgartner et al. ........... 415/53.1 |
| 4,084,918 | 4/1978 | Pavlecka .............. 415/53.1 |
| 4,124,329 | 11/1978 | Romanov et al. . |
| 4,162,410 | 7/1979 | Amick . |
| 4,222,700 | 9/1980 | Leuthard . |
| 4,234,289 | 11/1980 | Lebost . |
| 4,245,475 | 1/1981 | Girden . |
| 4,275,989 | 6/1981 | Gutierrez . |
| 4,293,273 | 10/1981 | Romanov et al. . |
| 4,295,783 | 10/1981 | Lebost . |
| 4,368,392 | 1/1983 | Drees . |
| 4,430,044 | 2/1984 | Liljegren . |
| 4,435,124 | 3/1984 | Zheng . |
| 4,555,218 | 11/1985 | Jonsson et al. ........... 416/17 |
| 4,609,827 | 9/1986 | Nepple . |
| 5,074,710 | 12/1991 | Gorlov . |
| 5,222,833 | 6/1993 | Gorlov . |

FOREIGN PATENT DOCUMENTS 2908689 9/1980 Germany .

OTHER PUBLICATIONS

P R S White, *A Phenimenological Design Tool for Wells Turbines,* Department of Mechanical and Manufacturing Systems, Coventry Polytechnic, UK, pp. 53–58; undated.

M. E. McCormick, B. Cochran, *A Performance Study of A Bi–Directional Radial Turbine,* U. S. Naval Academy and Johns Hopkins University, U.S.A., 6 pages, undated.

*Primary Examiner*—Edward K. Look
*Assistant Examiner*—James A. Larson
*Attorney, Agent, or Firm*—Weingarten, Schurgin, Gagnebin & Hayes

[57] ABSTRACT

A reaction turbine capable of providing unidirectional rotation under a reversible fluid flow is disclosed. The turbine comprises inflow and outflow fluid channels, a turbine chamber, and a working wheel with a plurality of airfoil-shaped blades mounted transversely to the direction of fluid flow for rotation in a plane parallel to the fluid flow. A channel directs the fluid flow to the blades. In the turbine chamber, the channel has a curved configuration having opposed changes in elevation or bulges directed towards the center of the turbine in a plane parallel to the flow of fluid to optimize the angle of attack of the fluid on the blades. In one embodiment, the channel also has a V or other linear or non-linear shape in transverse cross-section in the turbine chamber to smooth and direct the fluid flow. In another embodiment, the blades have a delta or other curvilinear shape, which smooths and directs the fluid flow and allows the channel to have a simpler rectangular cross-section. The turbine is capable of achieving high speeds at which electric generators conventionally operate and is suitable for use in hydro-pneumatic, hydro, wind, or wave power systems.

24 Claims, 8 Drawing Sheets

FIG. 3
(PRIOR ART)
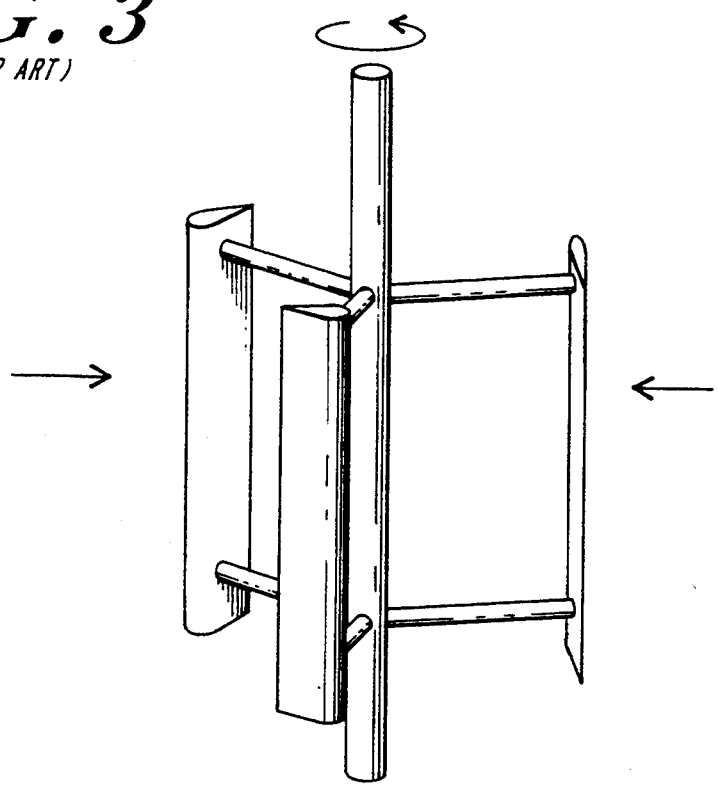
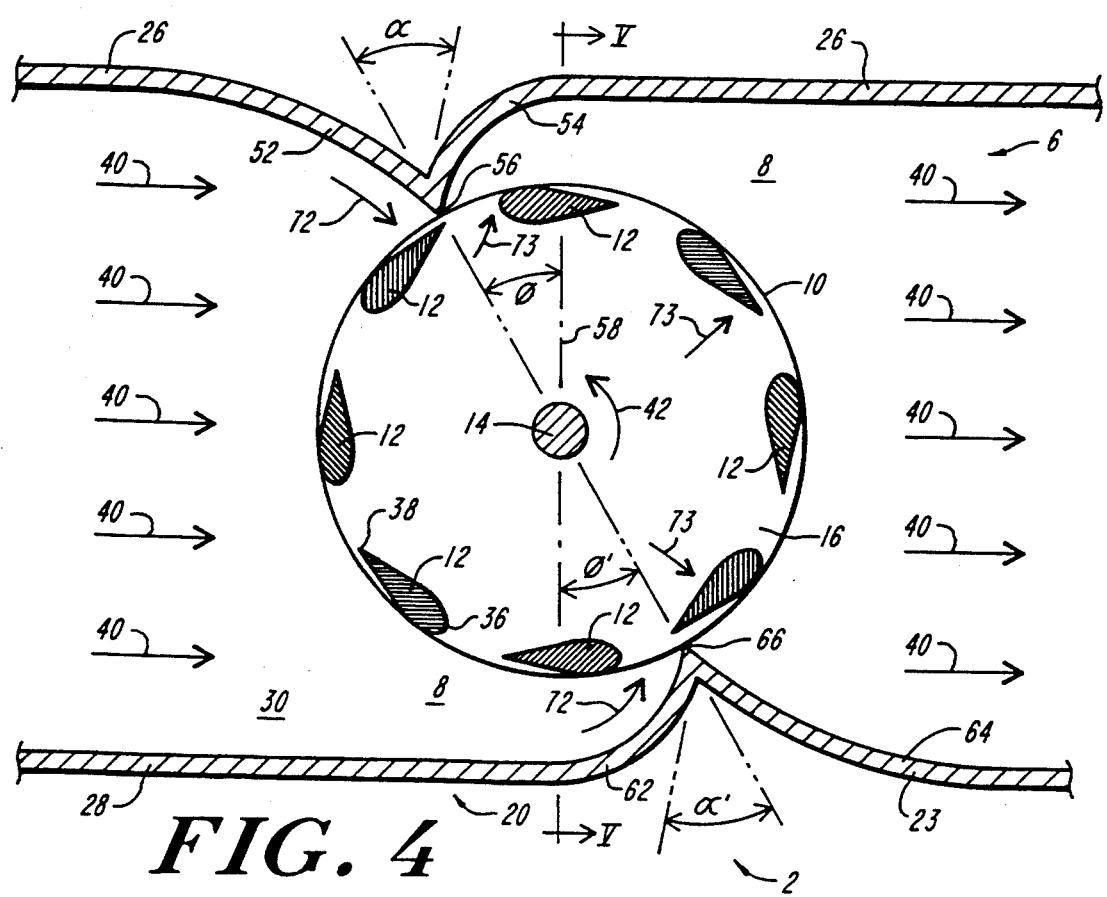
FIG. 4

5,451,138

UNIDIRECIONAL REACTION TURBINE OPERABLE UNDER REVERSIBLE FLUID FROM FLOW

FIELD OF THE INVENTION

This invention relates to reaction turbines and more particularly to unidirectional reaction turbines operable under reversible fluid flows for use with hydro-pneumatic, hydro, wind, or wave power systems.

BACKGROUND OF THE INVENTION

Hydro-pneumatic power systems are used for generating power from the tidal or current motion of water in oceans, bays, and rivers. Typically, such systems require a high water head. However, a system has been developed to generate power using a lower water head. This system is described in U.S. Pat. Nos. 5,074,710 and 5,222,833, the disclosures of which are incorporated herein by reference.

This system uses a pair of chambers, each having upstream ingress and downstream egress ports sealable by a water gate. The water gates are cross-coupled on a common shaft such that the upstream ingress water gate of one chamber is coupled for synchronous movement with the downstream egress water gate of the other chamber. The sets of cross-coupled water gates open and close alternately in synchronism. Thus, when one set of gates is open, water enters one chamber from the upstream flow and exits the other chamber into the downstream flow. When the water levels in the chambers equilibrate with the upstream and downstream water levels, the open set of gates closes by a counterweight and the opposite set of gates opens under the force of the water level differential. Water begins filling the chamber with the low water level and emptying from the chamber with the high water level. Thus, a cycle of alternately filling and emptying the water chambers is maintained.

Each chamber contains an air space above the water surface. The chambers are interconnected to each other by a channel or duct through which the air may flow. As one set of cross-coupled gates opens, air pressure builds up in the chamber which fills with water and a partial vacuum builds up in the chamber which is emptying of water, thereby generating a flow of air through the channel from the filling chamber to the emptying chamber. When the open set of gates closes and the opposite set of gates opens, the build up of pressure and vacuum in the chambers is reversed. Thus, a flow of air through the channel in the opposite direction is generated. An air turbine connected to an electric generator is mounted in the channel to convert the energy of the flowing air to electric energy.

As stated, the air flow through the channel periodically reverses direction. Either complex valving to redirect the air flow into a single directional stream prior to driving the turbine or a unidirectional air turbine, that is, one capable of providing unidirectional rotation from bidirectional air flow, is required. Generally, three basic types of unidirectional reaction turbines are known, the Wells turbine, the McCormick turbine, and the Darrieus turbine.

The Wells reaction turbine comprises a series of rectangular airfoil-shaped blades arranged concentrically to extend from a rotatable shaft, as shown in FIG. 1. Typically, the turbine is mounted within a channel that directs the fluid flow linearly along the axis of the rotatable shaft. The blades are mounted to extend radially from the rotatable shaft and rotate in a plane perpendicular to the direction of fluid flow. Regardless of the direction in which the fluid flows, the blades rotate in the direction of the leading edge of the airfoils, which, in FIG. 1, is counterclockwise.

The Wells turbine is capable of rapid rotation. Its blades move substantially faster than the flowing air, causing high noise. Also, its efficiency is relatively low, first, because the rectangular blades create turbulence in the slower air, and second, because the effective surface area of the airfoil-shaped blades is limited to the outer tips, where the linear velocity is greatest. The blades cannot capture all of the available energy in the flowing fluid.

The McCormick turbine comprises a series of V-shaped rotor blades mounted concentrically between two series of stator blades, as shown in FIG. 2. The rotor blades are mounted for rotation in a plane perpendicular to the direction of fluid flow. The stator blades direct fluid flow to the rotor blades. To achieve unidirectional rotation with bidirectional fluid flow, the outer stator blades are open to fluid flowing from one direction, while the inner stator blades are open to fluid flowing from the opposite direction.

The McCormick turbine is more quiet and could be more efficient than the Wells turbine. However, its rotational speed is too slow for direct operation of an electric generator. Gearing is required to increase the speed up into the range of 1800 to 3600 rpm. Its configuration is also complex and expensive to manufacture.

The Darrieus machine is a reaction turbine with rectangular airfoil-shaped blades oriented transversely to the fluid flow and generally parallel to the axis of rotation, as shown in FIG. 3. The blades may be attached to the axis by circumferential end plates, struts, or by other known means. In some variations, the blades are curved to attach to the ends of the axis. A Darrieus reaction turbine having straight rectangular blades, mounted vertically in a rectangular channel, has been placed directly in a flowing body of water to harness hydropower. As with any reaction turbine, the rectangular blades of the Darrieus turbine rotate much faster than the fluid flow, causing turbulence in the fluid and lowering the efficiency of the turbine.

Thus, a need still exists for a quiet, efficient, simple, unidirectional reaction turbine that can operate at high speeds without gearing multiplication.

SUMMARY OF THE INVENTION

The present invention provides a unidirectional reaction turbine capable of achieving high speeds needed for industrial electric generators. The turbine comprises inflow and outflow fluid channels, a turbine chamber, and a working wheel having a plurality of airfoil-shaped blades mounted transversely to the direction of fluid flow for rotation in a plane parallel to the direction of fluid flow. The blades extend between two supporting members, such as a pair of parallel discs, mounted on a rotatable shaft. The blades are arranged in a circle and are oriented so that the chord of each airfoil generally forms the chord of an arc of the circle. A channel is provided to direct the fluid flow to the blades. The blades rotate in the direction of the leading edge of the airfoil, regardless of the direction of fluid flow.

Since the turbine rotor is faster than the fluid flow, the flow tends to twist in the channel in the direction of the turbine's rotation. The channel walls are arranged with a circular configuration in a plane parallel to the flow of fluid to the turbine to follow the direction of the fluid flow and to optimize the angle of attack of the fluid on the blades. Energy losses are thereby reduced and efficiency is increased. Specifically, the top and bottom walls of the channel comprise two circular sections in a plane parallel to the direction of fluid flow. The sections meet along a line which is offset from the top and bottom of the circular blade trajectory and which is as close as possible to the blades' trajectory leaving a minimal clearance without interfering in the blades' rotation. In one embodiment, the top and bottom walls also incorporate a V-shaped or other linear or curvilinear-shaped configuration in a plane perpendicular to the direction of air flow to smooth and direct the flow of fluid to the blades. In another embodiment, the blades have the shape of a delta or other curvilinear wing to reduce an impact on the blades moving in the slower fluid and passing the sections of the channel having the narrowest blade clearance, to prevent choking of the flow. With the delta- or other curvilinear-shaped blades, the channel may have a simpler rectangular cross-section. The turbine can readily rotate at speeds of 1800 or 3600 rpm, the speeds at which conventional industrial generators typically operate, and can achieve efficiencies higher than the other turbines discussed. The turbine can operate at higher speeds if necessary by varying the number and area of the blades.

In the case of hydro-pneumatic energy conversion, the channel interconnects a pair of chambers in which air is alternately compressed and expanded due to the alternate filling and emptying of the chambers with water. The alternate compression and expansion causes the air flow to alternate in direction through the connecting channel. The reaction turbine, mounted in the channel, is in this manner able to capture the energy in the flowing air and convert it to rotary mechanical energy. The turbine is connected to an electric generator for generation of electrical energy. No additional gearing to increase the speed of the air turbine to the generator's speed is required.

DESCRIPTION OF THE DRAWINGS

The invention will be more fully understood from the following detailed description taken in conjunction with the accompanying drawings in which:

FIG. 3 is a schematic illustration of a prior art Darrieus turbine;

FIG. 4 is a cross-sectional side view of a reaction turbine according to the present invention;

DETAILED DESCRIPTION OF THE INVENTION

Figure 1:
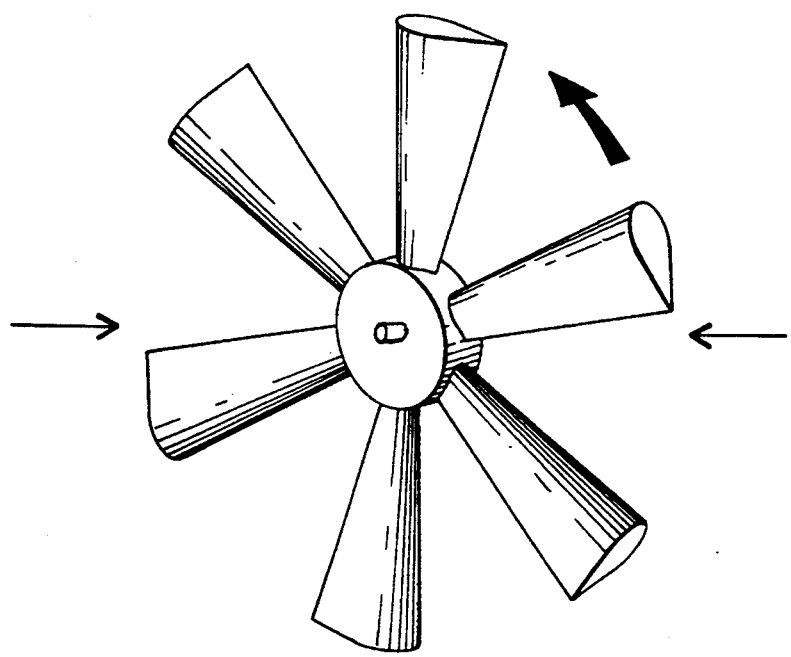
FIG. 1 is a schematic illustration of a prior art Wells turbine.
Figure 2:
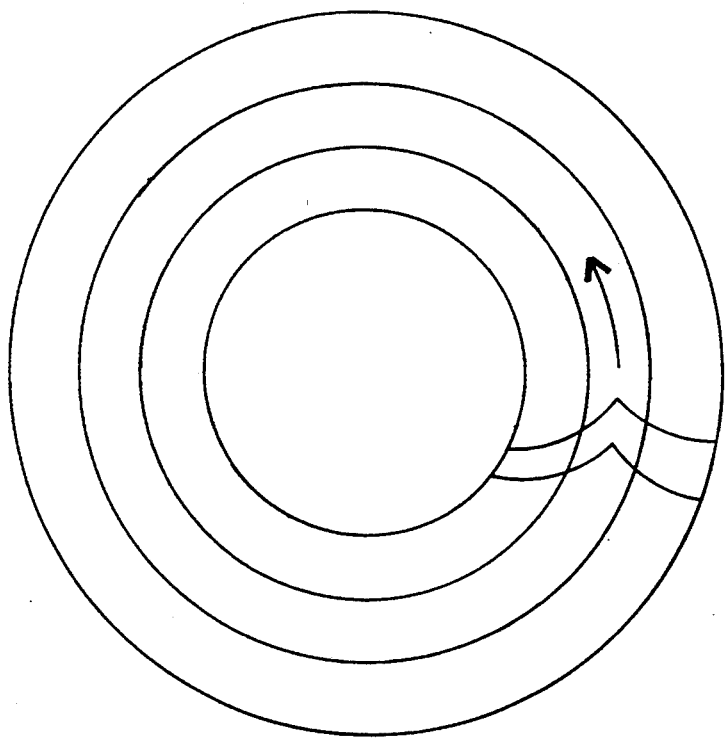
FIG. 2 is a schematic illustration of a prior art McCormick turbine.
Figure 5:
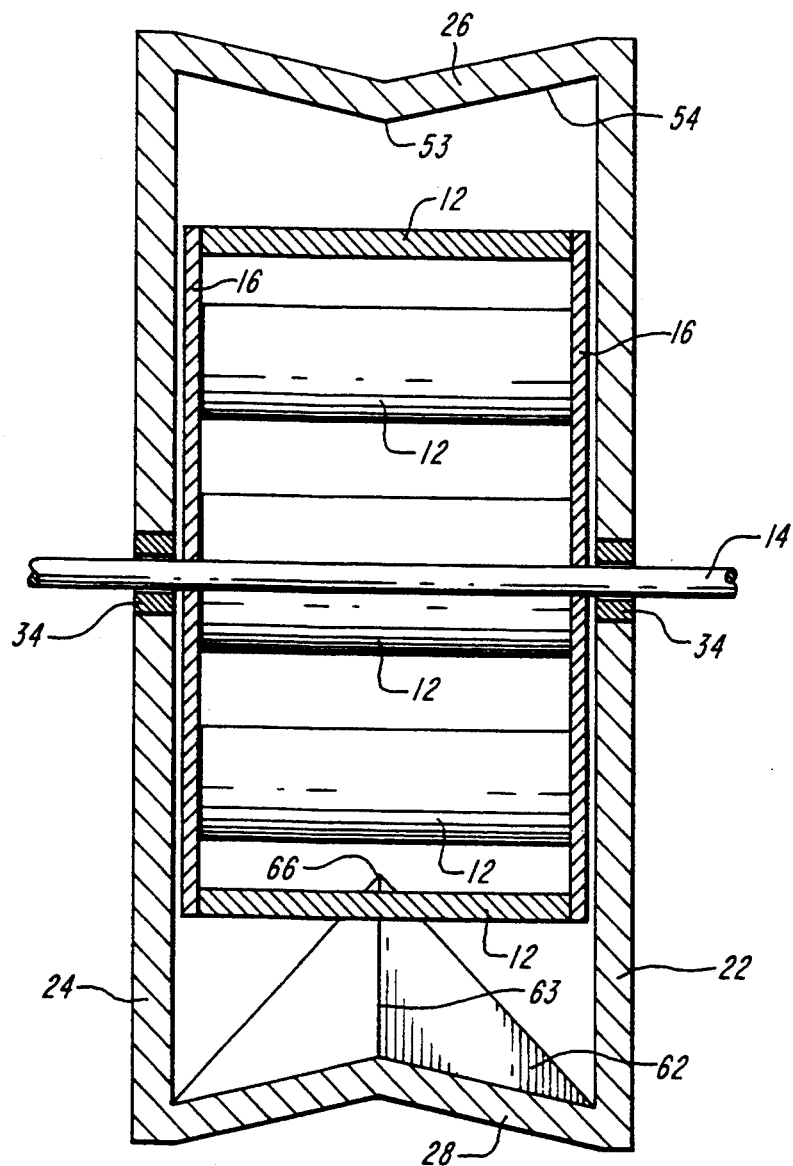
FIG. 5 is cross-sectional view along line V—V of the turbine of FIG. 4.
Figure 13:
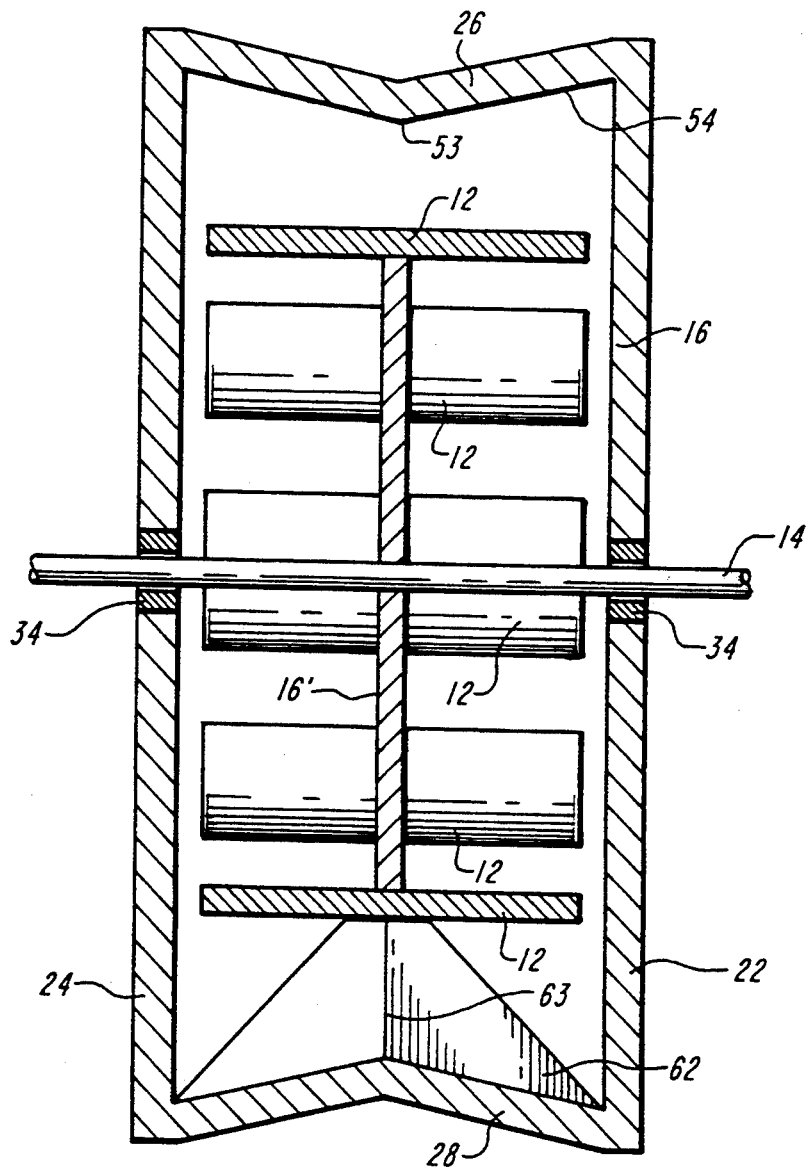
FIG. 13 is a cross-sectional side view of a further embodiment of a reaction turbine according to the present invention.
Figure 14:
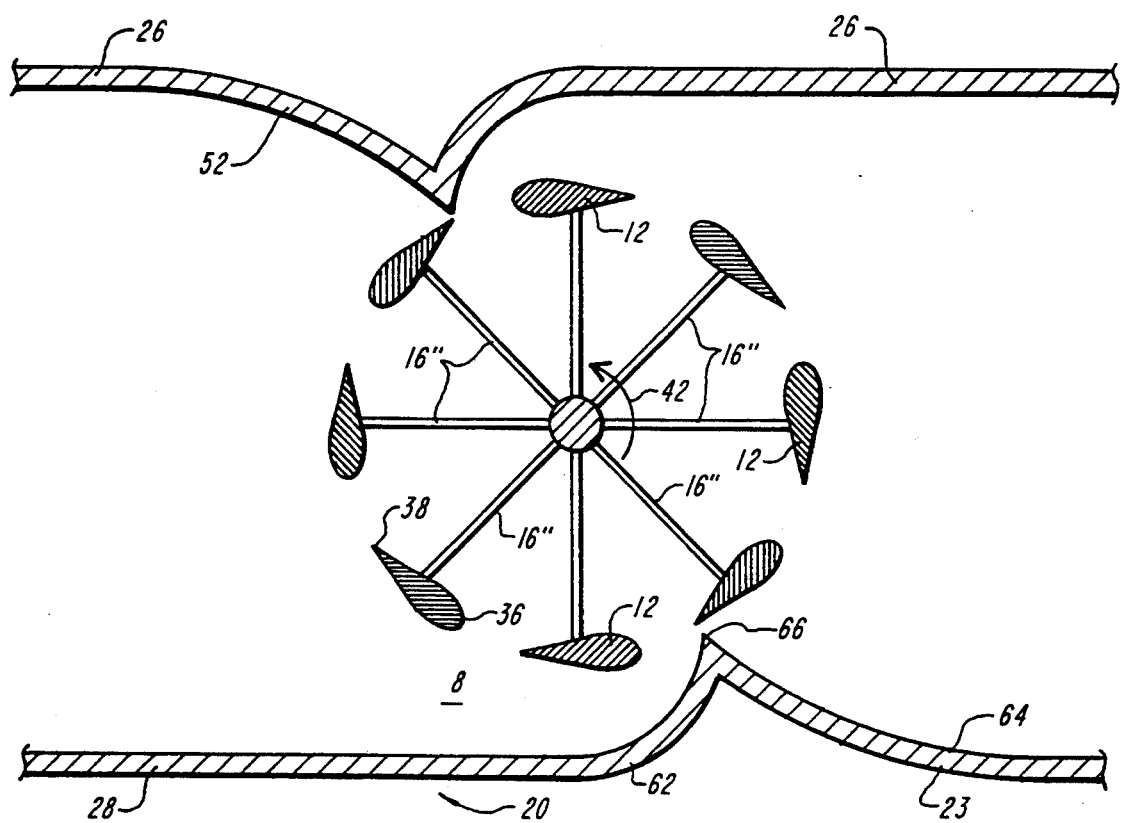
FIG. 14 is a cross-sectional view of a still further embodiment of a reaction turbine according to the present invention.

A reaction turbine 2 according to the present invention is shown in FIGS. 4 and 5. The turbine comprises inflow and outflow fluid channels 4, 6, a turbine chamber 8, and a working wheel 10 having a plurality of airfoil-shaped turbine blades 12 supported for rotation on a rotatable shaft 14 by one or more turbine blade support members 16. The airfoil-shaped blades may be formed from any suitable material, such as a steel or plastic material. The blade support members 16, which, in the embodiment shown, comprise parallel, circular discs, are fixedly mounted in spaced relation on the rotatable shaft 14 such that rotation of the blades 12 and discs 16 causes the shaft 14 to rotate as well. The blades 12 are fixedly mounted to extend transversely from one disc 16 to the other disc 16 and are spaced radially from the rotatable shaft 14. The blade support members may comprise other configurations, such as a single central disc 16' (see FIG. 13), radial spokes 16" (see FIG. 14), or the like.

The turbine 10 is mounted inside a channel 20 or duct. The channel generally comprises opposed side walls 22, 24, a top wall 26, and a bottom wall 28 which form a passage 30 for directing the flow of fluid to the turbine. The shaft 14 is oriented transversely to the flow of fluid through the channel and is mounted for rotation, for example, via bearings 34 in the side walls of the channel.

Each blade 12 has an airfoil shape with a leading edge 36 and a trailing edge 38 oriented transversely to the flow of fluid. Preferably, the blades are formed with a suitable airfoil profile, as is known in the art. The blades 12 are mounted at the outermost diameter of the circular discs 16 and are generally oriented to lie along a circle defined by the outer diameter of the discs such that the chord of each airfoil generally forms the chord of an arc of the circle. Any number of blades may be provided. The chords of the blades cover up to 90 percent of the circumference of the circle defined by the discs. Typically, the diapason ranges between 60 and 90 percent, although the exact value depends on the application. If too large an opening is left between blades, substantial energy from the fluid flow can be lost to the system.

Referring to FIG. 4, fluid flowing in the direction of arrows 40, along the channel 4, causes the turbine 10 to rotate in the direction of the leading edge 36 of the blades as shown by arrow 42. Similarly, referring to FIG. 6, fluid flowing in the opposite direction, designated by arrows 44, along the channel 6, also causes the turbine to rotate in the same direction, the direction of the leading edge 36 of the blades 12. As is apparent, the turbine rotates in a plane parallel to the flow of fluid. In addition to covering up to 90 percent of the circumference, the blades 12 should be spaced radially as far from the rotatable shaft 14 as practicable to capture the greatest amount of energy in the flowing fluid. Similarly, the longer the chord of the blades, the greater the fluid flow which the turbine can handle for the same speed of rotation.

Figure 6:
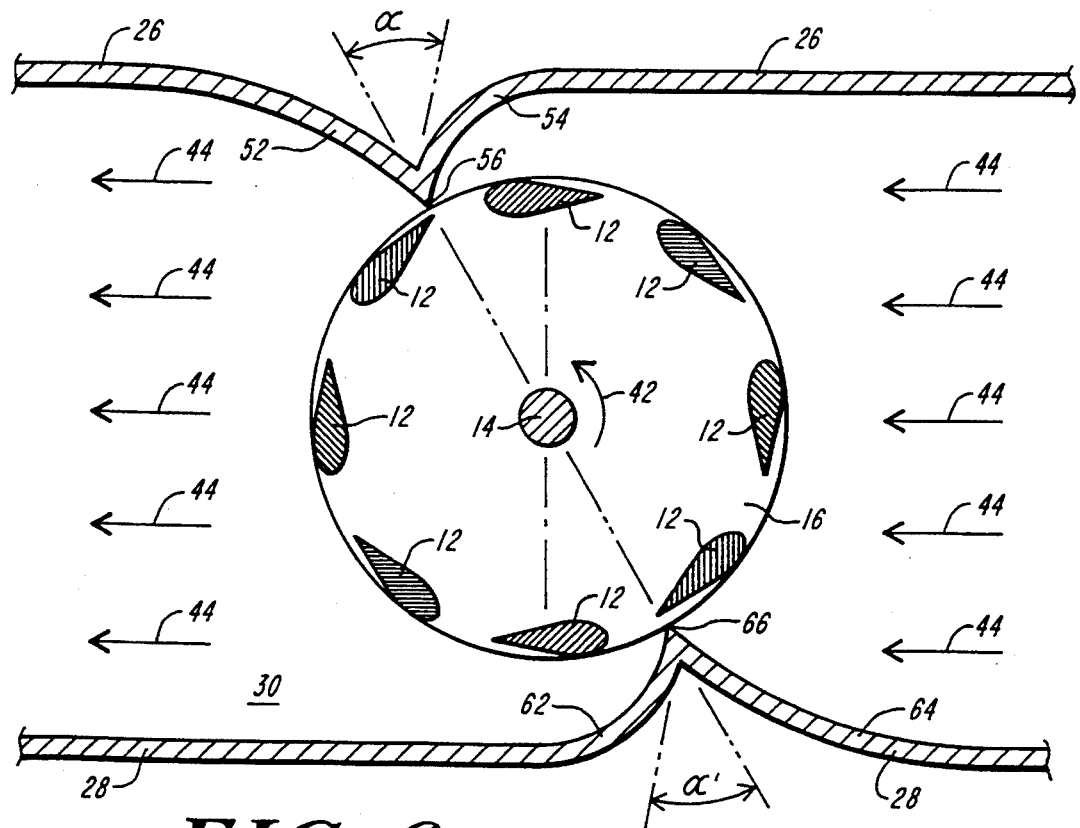
FIG. 6 is a cross-sectional side view of the turbine of FIG. 4 operating under fluid flow from the opposite direction.
Figure 8:
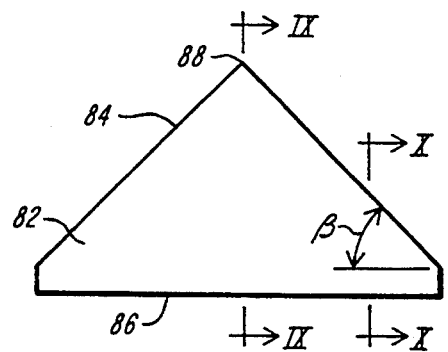
FIG. 8 is a plan view of a single delta turbine blade of the embodiment of FIG. 7.
Figure 9:
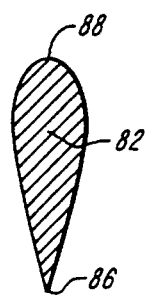
FIG. 9 is a cross-sectional view along line IX—IX of FIG. 8.
Figure 10:
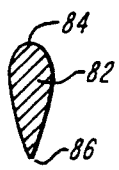
FIG. 10 is a cross-sectional view along line X—X of FIG. 8.

Rotation of the turbine tends to twist the flow of fluid past the turbine out of a generally linear path. The flow lines tend to follow the direction of rotation of the turbine. The channel 20 of the present invention has a curved configuration which generally follows the flow lines and optimizes the angle of attack of the fluid on the blades. Parallel to the fluid flow, at least one and preferably both the top wall 26 and the bottom wall 28 of the channel 20 incorporate bulges or changes in elevation, as best seen in FIGS. 4 and 6. Specifically, the top wall 26 comprises a first curved section 52 and a second curved section 54. Preferably the curvature comprises a circular arc. The curved sections 52, 54 meet along a point 56 as close to the trajectory of the blades 12 as possible to provide minimal clearance between the blades and the channel. When the fluid flow is in the direction of arrows 40 in FIG. 4, the first section 52 is upstream of the turbine and the second section 54 is downstream of the turbine. When the fluid flow is reversed, as in FIG. 6, the first section 52 is downstream of the turbine and the second section 54 is upstream.

Similarly, the bottom wall 28 comprises a first curved section 62 and a second curved section 64. Preferably, the curvature comprises a circular arc. The curved sections meet along a point 66 as close to the trajectory of the blades 12 as possible to provide minimal clearance between the blades and the channel. When the fluid flow is in the direction of arrows 40 in FIG. 4, the first section 62 is upstream of the turbine and the second section 64 is downstream of the turbine. When the fluid flow is reversed, as in FIG. 6, the first section 62 is downstream of the turbine and the second section 64 is upstream. The top and bottom curved sections 52, 54, 62, 64 may be formed in any suitable manner, such as by providing a channel with appropriately curved walls or by providing appropriately curved inserts within a rectangular channel.

The channel 20 has a rectangular cross-section far from the turbine. In the turbine chamber 8, the top wall 26 is bisected longitudinally into two lengthwise sections divided by a centerline 53, as shown in FIG. 5. The centerline 53 dips toward the trajectory of the turbine wheel, imparting to the top wall a slight angle or V shape in transverse cross-section, i.e., in a plane perpendicular to the flow of the fluid.

Similarly, in the turbine chamber 8, the bottom wall 28 is bisected longitudinally into two lengthwise sections divided by a centerline 63. The centerline 63 rises toward the trajectory of the turbine wheel, imparting to the bottom wall a slight angle or V shape in transverse cross-section, i.e., in a plane perpendicular to the flow of the fluid. The angles of the top and bottom walls become continually narrower as the centerlines approach the turbine, until they reach their narrowest angle at the point of minimal clearance with the blade's trajectory. The angle or V shape helps to smooth out and direct the fluid approaching the turbine and allows the fluid to pass the rectangular blades at the points 56, 66 of minimal clearance with the top and bottom walls without choking. The wall sections on each side of the centerlines may be planar, as shown in FIG. 5, or may have a concave curvature to provide greater flow of fluid to the blades if desired.

As can be seen in FIG. 4, the top point 56 is angularly offset in the direction of rotation from an axis 58 through the center of rotation of the turbine and perpendicular to the fluid flow by an angle $\phi$. The bottom point 66 is also angularly offset in the direction of rotation from the axis 58 through the center of rotation of the turbine and perpendicular to the fluid flow by an angle $\phi'$. $\phi'$ is preferably the same as the angle $\phi$, so that the configurations of the top and bottom channels are symmetric.

$\phi$ and $\phi'$ may range from slightly greater than 0° to 90°. In general, the higher the speed of turbine operation, the greater the angle $\phi$ or $\phi'$ should be. Other parameters affecting $\phi$ and $\phi'$ are the diameter of the turbine, the shape of the turbine blades, the material out of which the channel and blades are formed, and the surface finish or roughness. The preferred range of the angle $\phi$ for anticipated operational turbine speeds has been determined experimentally to lie between 15° and 45°.

Also, the top point 56 forms the vertex of an angle $\alpha$ between the tangents at the top point 56 to the circles defining the configuration of each top section 52, 54. Similarly, the bottom point 66 forms the vertex of an angle $\alpha'$ between the tangents at the bottom point 66 to the circles defining the configuration of each bottom section 62, 64 at the bottom point 66. Preferably, $\alpha$ and $\alpha'$ are the same, maintaining the symmetry between the top and bottom channels. The preferred range of the angles $\alpha$ and $\alpha'$ has been determined experimentally to lie between 30° and 45°.

In operation, the circular curvature of the top and bottom walls imparts a significant radial component, with respect to the surface of each blade, to the fluid stream striking all of the blades, as indicated generally by the arrows 72. When the fluid flows in the direction of the arrow 40 of FIG. 4, the force driving the turbine is increased primarily by the fluid striking the blades along the lower part of the trajectory. Similarly, when the fluid flow is reversed, as in FIG. 6, fluid striking the blades at the upper part of the trajectory is primarily effective in increasing the force driving the turbine. Fluid flow striking the blades on the opposite or downstream side of the turbine also has a significant radial component, as shown by arrows 73, which also aids in driving the turbine. In operation, the linear velocity of the turbine blades is greater than the velocity of the fluid.

Figure 7:
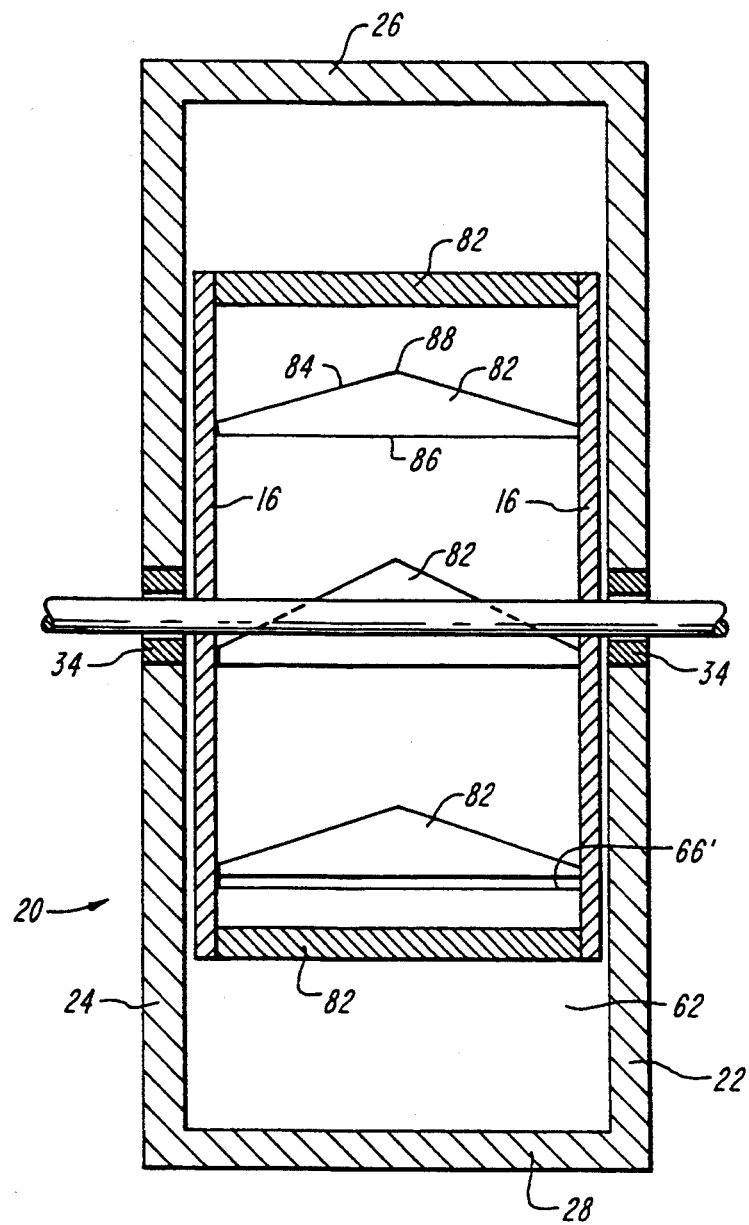
FIG. 7 is a cross-sectional view of a further embodiment of the reaction turbine of the present invention.
Figure 12:
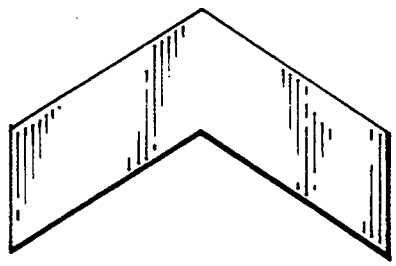
FIG. 12 is a plan view of an alternative embodiment of a single turbine blade.

A further embodiment of the present invention is shown in FIGS. 7 through 10. As can be seen in FIG. 7, which is a view similar to that of FIG. 5, the channel 20 has a rectangular cross-sectional configuration near the turbine, rather than the V-shaped top and bottom walls as shown in FIG. 5. The blades, shown more particularly in FIGS. 8 through 10, have a delta shape, with a leading edge 84 and a trailing edge 86. The angle $\beta$, the angle of the sides to a line normal to the blade's centerline, typically ranges from 10° to 60°. The exact value depends on the particular application. The greater the fluid velocity, the greater the angle, to reduce frictional losses between the blades and the fluid. The greatest thickness of the blades occurs near the blade's nose 88, which presents the least width transversely to the flow of fluid. The least thickness of the blades occurs at the trailing edge 86. Although a delta shape, as shown, is preferred, other curvilinear shapes may be used. FIG. 12 shows a further example of a suitable blade.

Due to the rectangular cross-section of the channel, the top and bottom curved sections 52, 54, 62, 64, approach the turbine along a line, indicated by bottom line 66' in FIG. 7, rather than a point, as in FIG. 5. A similar line (not shown) is present on the top wall. If rectangularly-shaped blades, such as the blades 12, were used in a rectangular channel, a choke situation could develop. As the blades pass the line 66' of minimal clearance, the flow would be restricted and could potentially choke. The delta blades 82 of the present invention eliminate this problem, because the thickest part of the blade occurs near the nose 88, which presents the least transverse blade width to the flow. Thus, the fluid can continue to flow along and past the sides of the blades. The greatest transverse blade width occurs at the trailing edge 86 of the blade, which also has the least blade thickness. Accordingly, the clearance between the outer blade surface and the line 66' is increased and the fluid can continue to flow over the outer surface of the blades. In this manner, a choke situation is obviated.

The rotatable shaft 14 of the turbine may be connected in any manner known in the art to an electric generator. The turbine is capable of rotating at speeds of 1800 or 3600 rpm, the speeds at which conventional industrial generators operate, and achieving the highest efficiencies. Higher speeds can be achieved if necessary. In this manner, the energy in the flowing fluid is readily converted to usable electrical energy without using gearing speed multiplication.

Figure 11:
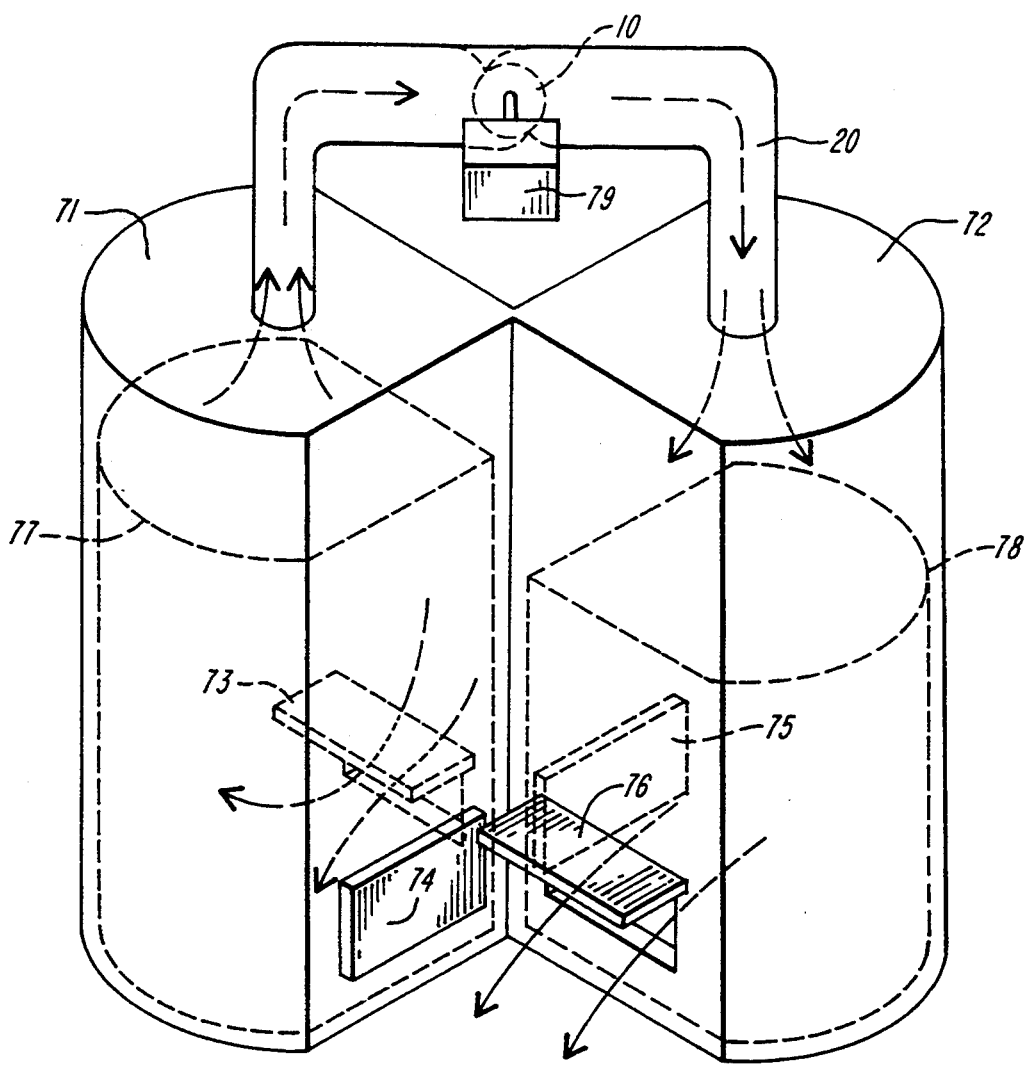
FIG. 11 is a schematic illustration of the reaction turbine of the present invention in operation in a hydro-pneumatic power system.

The reaction turbine of the present invention is shown in FIG. 11 in operation in association with a hydro-pneumatic power generation system, such as that disclosed in U.S. Pat. Nos. 5,074,710 or 5,222,833. As generally described above, the system comprises two water chambers 71, 72 interconnected by ingress and egress ports 73, 74, 75, 76 on common shafts. As the water level 77, 78 in the two chambers alternately rises and falls, air in the space above the water level is alternately compressed and expanded. The air flows through the channel 20 interconnecting the two chambers, alternating directions in synchronism with the rising and falling water levels.

The reaction turbine 10 of the present invention is mounted within the channel. The flowing air causes the turbine to rotate as described above. When the flow of water through the chambers reverses, the flow of air through the channel also reverses. However, the turbine continues to rotate in the same direction. During the air flow cycle, the air flows in a first direction and the speed of the air increases to a maximum. The speed then decreases until it reaches zero and then begins again to increase in the opposite direction as the air flows in the opposite direction. The turbine continues to rotate in the same direction, although its rotation speed varies somewhat with the increase and decrease in the speed of the air.

The turbine is connected in any suitable manner to an electric generator 79 for generating electricity. The turbine can reach speeds of 1800 or 3600 rpm with water heads of as low as one or two feet. Thus, the system is suitable for generating power on small rivers. Further, the water chambers can operate without any water head differential if the velocity of the current flow is strong enough, such as in some tidal estuaries. Accordingly, the present system can be used in locations where strong currents are generated, but construction of a dam is not economically feasible or environmentally desirable.

The reaction turbine of the present invention may also be used in wind and wave power systems to harness the energy of the wind and waves.

The invention is not to be limited by what has been particularly shown and described, except as indicated by the appended claims.

We claim:

1. A unidirectional reaction turbine capable of rotation under reversible fluid flow comprising:
   a fluid flow path defined by an inflow fluid channel and an outflow fluid channel, and a turbine chamber disposed between said inflow and outflow channels;
   a rotatable shaft transversely mounted in said turbine chamber;
   at least one turbine blade support member fixedly mounted to said rotatable shaft for rotation therewith in a plane perpendicular to said shaft;
   a plurality of turbine blades disposed in said turbine chamber, each blade having a delta configuration and an airfoil shape having a leading edge and a trailing edge and a chord therebetween, said airfoil shape oriented transversely to said flow path with said chord lying generally along a circular rotation path, each of said blades fixedly mounted to said blade support member to be parallel to and radially spaced from said rotatable shaft and oriented for rotation along said rotation path in a plane parallel to said flow path in the direction of said leading edge; and
   said turbine chamber having a curved configuration having opposite elevations in the plane parallel to said flow path, said elevations being offset in a direction of rotation of said leading edge to rotatably channel fluid in said flow path and to direct fluid flow to said plurality of blades with a radial component of flow relative to said blades.

2. The unidirectional reaction turbine of claim 1, wherein said airfoil shapes have the same angular orientation with respect to said rotatable shaft.

3. The unidirectional reaction turbine of claim 1, wherein said at least one turbine blade support member comprises a pair a parallel, circular discs fixedly supported on said rotatable shaft.

4. The unidirectional reaction turbine of claim 3, wherein each of said plurality of turbine blades extends transversely between said discs of said pair of discs.

5. The unidirectional reaction turbine of claim 1, wherein said at least one turbine blade support member comprises a plurality of radial spokes.

6. The unidirectional reaction turbine of claim 1, further comprising an electric generator operatively connected to said rotatable shaft.

7. The unidirectional reaction turbine of claim 1, wherein said turbine chamber includes a top wall having a first top section having a curved configuration and a second top section having a curved configuration, the first and second top sections meeting at a top line adjacent to a circular trajectory of said blades, and said turbine chamber includes a bottom wall having a first bottom section having a curved configuration and a second bottom section having a curved configuration, the first and second bottom sections meeting at a bottom line adjacent to the circular trajectory of said blades.

8. The unidirectional reaction turbine of claim 7, wherein at least one of said top line or said bottom line is offset in the direction of rotation from the axis through said rotatable shaft and perpendicular to said flow path.

9. The unidirectional reaction turbine of claim 1, wherein said turbine chamber includes a top wall having a first top section having a curved configuration and a second top section having a curved configuration, the first and second top sections meeting at a top point adjacent to a circular trajectory of said blades, and said turbine chamber further includes a bottom wall having a first bottom section having a circular configuration and a second bottom section having a circular configuration, the first and second bottom sections meeting at a bottom point adjacent to the circular trajectory of said blades.

10. The unidirectional reaction turbine of claim 9, wherein said top wall and said bottom wall further have a V-shaped configuration in transverse cross-section.

11. The unidirectional reaction turbine of claim 10, wherein the angle of said V-shaped configuration of said top wall and said bottom wall becomes gradually narrower as said top wall approaches said top point and said bottom wall approaches said bottom point.

12. A unidirectional reaction turbine capable of rotation under reversible fluid flow comprising:
a fluid flow path defined by an inflow fluid channel and an outflow fluid channel, and a turbine chamber disposed between said inflow and outflow channels;
a working wheel mounted in said turbine chamber comprising:
a rotatable shaft transversely mounted in said turbine chamber;
at least one turbine blade support member fixedly mounted to said rotatable shaft for rotation therewith in a plane perpendicular to said shaft;
a plurality of turbine blades disposed in said turbine chamber, each blade having a delta configuration and an airfoil shape having a leading edge and a trailing edge and a chord therebetween, said airfoil shape oriented transversely to said flow path with said chord lying generally along a circular rotation path, each of said blades fixedly mounted to said blade support member to be parallel to and radially spaced from said rotatable shaft and oriented for rotation along said rotation path in a plane parallel to said flow path in the direction of said leading edge; and
said turbine chamber further comprises a channel having a curved configuration having opposite elevations in the plane parallel to said flow path, said elevations being offset in a direction of rotation of said leading edge to rotatably channel fluid in said flow path and to direct fluid flow to said plurality of blades with a radial component of flow relative to said blades.

13. A unidirectional reaction turbine capable of rotation under reversible fluid flow comprising:
a fluid flow channel having a flow path section defining a fluid flow path;
a rotatable shaft transversely mounted within said flow path section;
at least one turbine blade support member fixedly mounted to said rotatable shaft for rotation therewith in a plane perpendicular to said shaft; and
a plurality of delta-shaped turbine blades, each blade having an airfoil shape oriented transversely to said flow path and having a leading edge and a trailing edge, said leading edge having a portion disposed at an angle with respect to said rotatable shaft, each of said blades fixedly mounted to said blade support member to be parallel to and radially spaced from said rotatable shaft for rotation in a plane parallel to said flow path; and
said flow path section of said channel having a curved configuration having opposite elevations in the plane parallel to said flow path, said elevations being offset in a direction of rotation of said leading edge to rotatably channel fluid in said flow path and to direct fluid flow to said plurality of blades with a radial component of flow relative to said blades.

14. The unidirectional reaction turbine of claim 13, wherein said airfoil shapes have the same angular orientation with respect to said rotatable shaft.

15. The unidirectional reaction turbine of claim 13, wherein said at least one turbine blade support member comprises a pair a parallel, circular discs fixedly supported on said rotatable shaft.

16. The unidirectional reaction turbine of claim 15, wherein each of said plurality of turbine blades extends transversely between said discs of said pair of discs.

17. The unidirectional reaction turbine of claim 13, wherein said at least one turbine blade support member comprises a plurality of radial spokes.

18. The unidirectional reaction turbine of claim 13, wherein said at least one turbine blade support member comprises a disc fixedly centrally supported on said rotatable shaft.

19. The unidirectional reaction turbine of claim 13, further comprising an electric generator operatively connected to said rotatable shaft.

20. The unidirectional reaction turbine of claim 13, wherein said flow path section of said channel includes a top wall having a first top section having a curved configuration and a second top section having a curved configuration, the first and second top sections meeting at a top line adjacent to a circular trajectory of said blades, and said flow path section of said channel includes a bottom wall having a first bottom section having a curved configuration and a second bottom section having a curved configuration, the first and second bottom sections meeting at a bottom line adjacent to the circular trajectory of said blades.

21. The unidirectional reaction turbine of claim 20, wherein at least one of said top line or said bottom line is offset in a direction of rotation of said leading edge from the axis through said rotatable shaft and perpendicular to said flow path.

22. The unidirectional reaction turbine of claim 13, wherein said flow path section of said channel includes a top wall having a first top section having a curved configuration and a second top section having a curved configuration, the first and second top sections meeting at a top point adjacent to a circular trajectory of said blades, and said flow path section of said channel includes a bottom wall having a first bottom section having a circular configuration and a second bottom section having a circular configuration, the first and second bottom sections meeting at a bottom point adjacent to the circular trajectory of said blades.

23. The unidirectional reaction turbine of claim 22, wherein said top wall and said bottom wall further have a V-shaped configuration in transverse cross-section.

24. The unidirectional reaction turbine of claim 23, wherein the angle of said V-shaped configuration of said top wall and said bottom wall becomes gradually narrower as said top wall approaches said top point and said bottom wall approaches said bottom point.

* * * * *

UNITED STATES PATENT AND TRADEMARK OFFICE
CERTIFICATE OF CORRECTION

PATENT NO.  : 5,451,138
DATED       : September 19, 1995
INVENTOR(S) : Boris L. Istorik, et al.

It is certified that error appears in the above-indentified patent and that said Letters Patent is hereby corrected as shown below:

```
In the title, on the cover page and in column 1, lines 1-5,
the title reads "UNIDIRECIONAL REACTION TURBINE OPERABLE UNDER
REVERSIBLE FLUID FROM FLOW" the title should read --UNIDIRECTIONAL
REACTION TURBINE OPERABLE UNDER REVERSIBLE FLUID FLOW--.
```

Signed and Sealed this

Ninth Day of April, 1996

*Attest:*

BRUCE LEHMAN

*Attesting Officer*  *Commissioner of Patents and Trademarks*